2,252,146

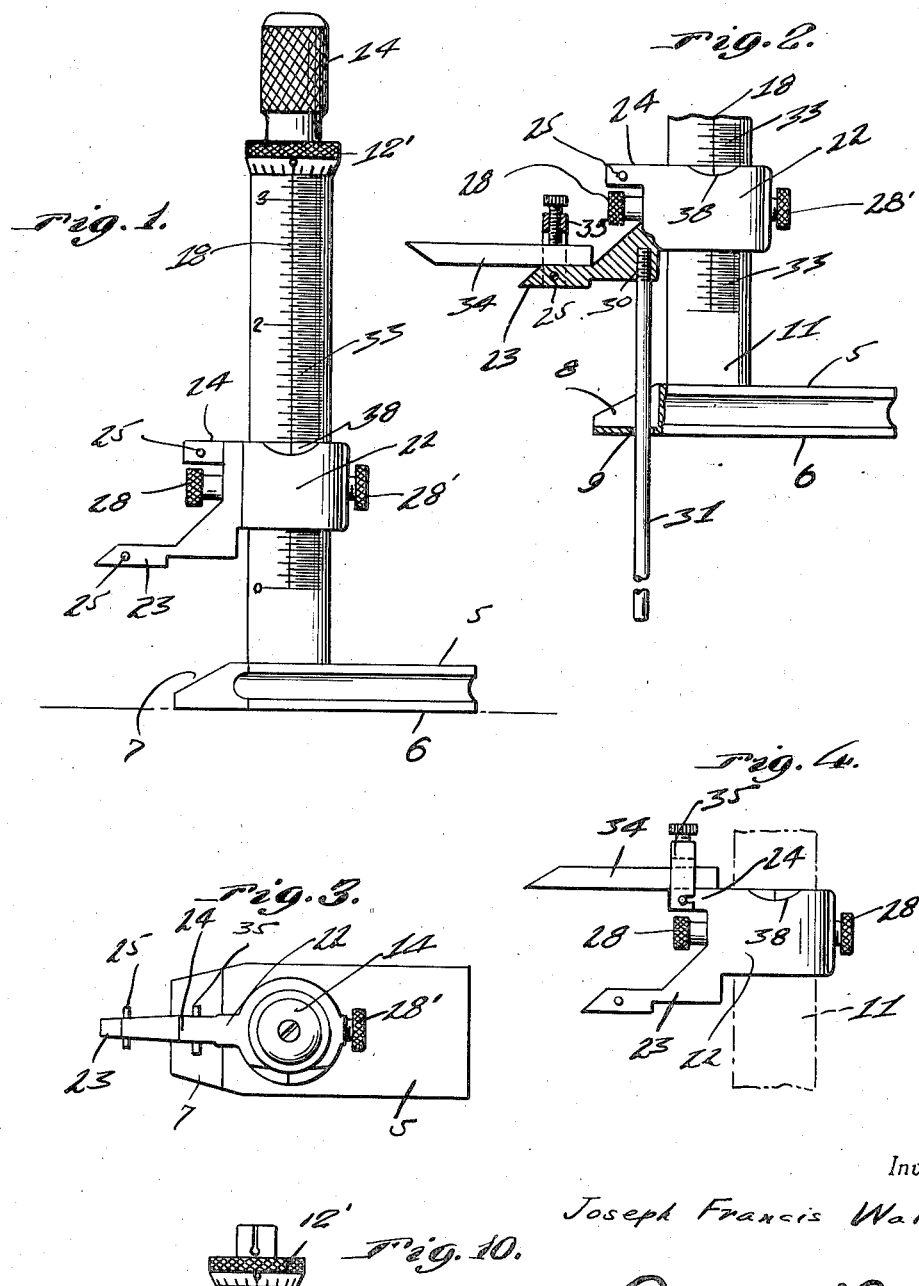

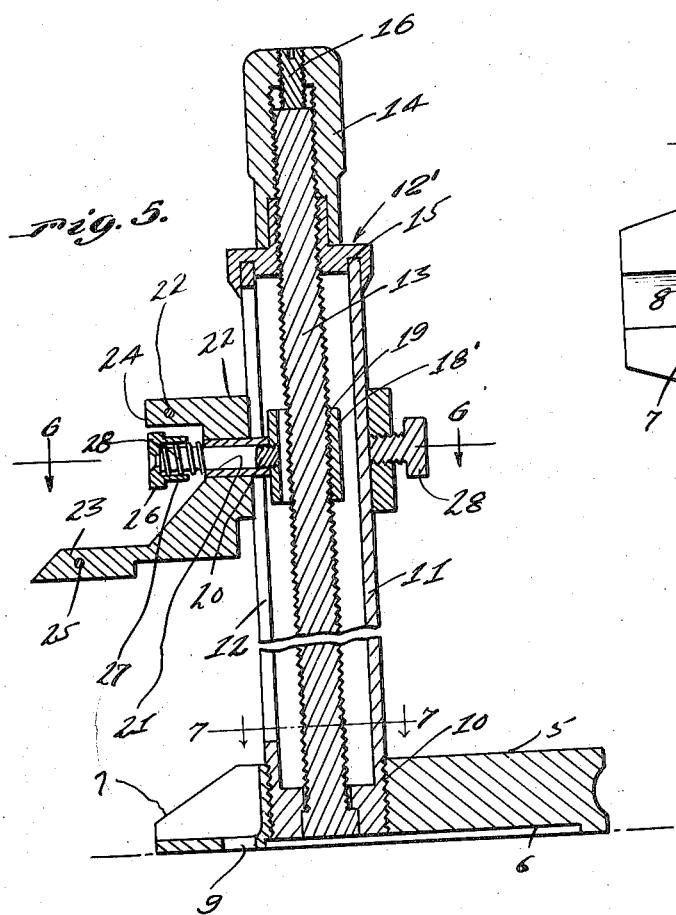
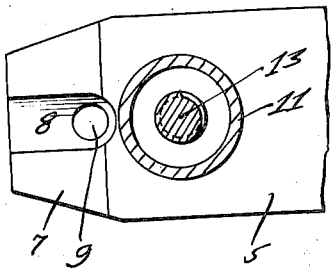
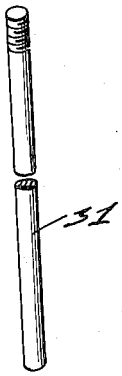
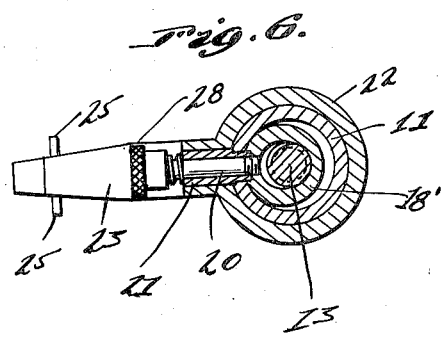
Inventor
Joseph Francis Walsh
By Clarence A. O'Brien
Attorney Patented Aug. 12, 1941

UNITED STATES PATENT OFFICE 2,252,146

MEASURING INSTRUMENT

Joseph Francis Walsh, Newport, R. I.

Application August 28, 1940, Serial No. 354,615

2 Claims. (Cl. 33—170)

This invention relates to a measuring instrument, and has for the primary object the provision of a device of this character which will combine in one unit a height gauge and a depth gauge whereby measurements may be accurately, conveniently and quickly carried out and includes means for permitting a scriber to be employed in conjunction with said device and which may be easily reversed on the device for measuring under projections by sense of feel.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a measuring instrument constructed in accordance with my invention.

Figure 2 is a fragmentary side elevation, partly in section, showing the instrument arranged as a depth gauge.

Figure 3 is a top plan view illustrating the device.

Figure 4 is a fragmentary side elevation illustrating the scriber adapted to the device in one of its positions.

Figure 5 is a vertical sectional view illustrating the device.

Figure 6 is a sectional view taken on the line 6—6 of Figure 5.

Figure 7 is a sectional view taken on the line 7—7 of Figure 5.

Figure 8 is a perspective view of a gauge rod.

Figure 9 is a side elevation illustrating a clamp employed for detachably mounting the scriber.

Figure 10 is a side elevation showing an adjusting sleeve.

Referring in detail to the drawings, the numeral 5 indicates a base of elongated formation and has a flat under face 6 to permit the base to rest flatly or evenly on a surface. One end of the base 5 is reduced by bevelling, as shown at 7, and formed in the beveled face is a recess 8 opening outwardly through the top face of the base as well as the reduced end thereof. The base is provided with a depth gauge rod opening 9 located within the recess 8.

The base 5 adjacent the reduced end 7 is provided with a screw threaded opening 10 in which is threaded the lower end of a vertically arranged hollow post 11 provided in one wall thereof with a slot 12. Secured in the lower end of the post 11 and extending outwardly of the upper end thereof is a feed stem 13. It is to be understood that a rotatable connection is provided between the lower end of the stem 13 and the lower end of the post 11. A finger knob 14 is threaded onto the upper end of the feed stem and receives a portion of an adjusting sleeve 12' which is grooved to receive the upper end of the post, as shown at 15, and is threaded on the stem. The finger piece 14 is further secured on the stem by a set screw 16. The piece 14 is employed for rotating the feed stem 13 in either direction and the sleeve 12' moves therewith and has thereon graduations 17 to coact with a line marking 18 arranged vertically on the post.

A sleeve 18' is loosely fitted on the wall thereof within the post and a portion of the wall thereof has feed threads 19 to mesh with the feed threads of the feed stem. The sleeve 18' being thus constructed provides what may be termed as a half nut which when adjusted with relation to the feed stem may be made to move freely of the feed stem for quick adjustment or may be moved to mesh with the feed stem whereby the feed nut may be caused to move upwardly and downwardly with relation to the post by the rotation of the finger piece 14.

A stem 20 is formed on the sleeve 18' and slides in a rigid tube 21 extending through the slot 12 and which is carried by a work holder 22 in the form of a block which is bifurcated to provide superimposed extensions 23 and 24 each having on opposite faces thereof pins 25. It is to be understood that the holder 22 is mounted on the tube, as clearly shown in Figure 5.

The stem 20 extends through the tube and carries a finger piece 26 cupped, as shown at 27, and received therein is a coil spring 28. The coil spring bears against the finger piece 26 and the tube 21 for the purpose of urging the sleeve 18' in a position of engaging the threads 19 thereof with the threads of the feed stem 13.

The holder 22 is in the form of a collar which surrounds the post for sliding movement thereon and is equipped with a set screw 28 whereby the set screw may be turned in engagement with the post whenever desired to lock the member 22 in its adjusted position.

By pressing on the finger piece 26 it is possible to disengage the threads 19 of the sleeve 18' from the feed stem so that the member 22 can be adjusted quickly and vertically of the post in either direction.

The member 22 is provided with a screw threaded socket 30 in which a depth gauge rod 31 may be threaded. The rod 31 operates through the opening 9 when making measurements as to depth. It is to be understood that rods of different lengths may be employed.

The post upon the exterior thereof is provided with graduations 33 preferably in inches and fractions thereof.

To employ the device as a height gauge, the gauge is placed adjacent the object to be measured and the extension 23 is brought into engagement with the upper end of the object and by noting the scale markings with relation to the sleeve portion of the member 22 an accurate measurement of the height of said object may be determined. It is to be understood that the member 22 can be raised to the upper end of the object by rotating the finger piece 14 or by disengaging the half nut from the feed stem and sliding the member 22 upwardly until the extension 22 engages with the upper end of the object. By releasing the finger piece 26 the half nut again engages with the feed stem and secures the member 22 against sliding movement with the extension 22 in engagement with the upper end of the object.

If at any time it is desired to lock the member 22 against sliding movement on the post the set screw 28 is turned in engagement with the post.

By adapting a scriber 34 to the extension 24 the device may be made to measure for a greater height or if desired, the scriber 34 may be applied to the extension 23 in a reverse position so as to measure under objects by the sense of feel. In order that the scriber 34 may be applied to either of the extensions 23 or 24 a substantially U-shaped clamp 35 is employed and is provided with notches 36 to engage with the pins 25 and includes a set screw 37 to be turned in engagement with the scriber after the latter has been placed in position with either the extension 23 or 24.

To employ the device as a depth gauge, the rod 31 is adapted to the member 22 and is operable through the opening 9. The base 5 is arranged on the object and the rod lowered by rotating the finger piece 14 until it engages the bottom of the chamber or recess being measured and by noting the reading of the scale in relation to the member 22 the depth of the recess or chamber can be easily and accurately determined.

It is preferable that the collar portion of the member 22 be beveled, as shown at 38, to provide a reading edge to coact with the scale 33.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a gauge, an elongated base having one end beveled and provided with a recess opening outwardly through the top face of the base and said beveled end, said base having an opening connecting with the recess, a scale post secured to and rising from the base adjacent the recess, a sleeve slidable on said post, means for adjusting said sleeve on the post, a block formed on said sleeve and bifurcated to provide superimposed extensions one of an increased length over the length of the other extension and provided with a screw threaded socket aligning with the opening to receive a screw threaded end of a depth gauge rod movable through the opening of said base, the lowermost extension having a stepped lower face to enter said recess of the base and permit a portion of the lower face of the latter-named extension to move into a position flush with the bottom face of said base, and means for removably mounting a scriber on either of said extensions.

2. In a gauge, an elongated base having one end beveled and provided with a recess opening outwardly through the top face of the base and said beveled end, said base having an opening connecting with the recess, a scale post secured to and rising from the base adjacent the recess, a sleeve slidable on said post, means for adjusting said sleeve on the post, a block formed on said sleeve and bifurcated to provide superimposed extensions one of an increased length over the length of the other extension and provided with a screw threaded socket aligning with the opening to receive a screw threaded end of a depth gauge rod movable through the opening of said base, the lowermost extension having a stepped lower face to enter said recess of the base and permit a portion of the lower face of the latter-named extension to move into a position flush with the bottom face of said base, and a substantially U-shaped clamp including a set screw applicable to either of said extensions to detachably secure thereon a scriber.

JOSEPH FRANCIS WALSH.